(12) United States Patent
Saturley et al.

(10) Patent No.: US 12,523,830 B2
(45) Date of Patent: Jan. 13, 2026

(54) SMALL FOOTPRINT INDEPENDENT HEATSINK ATTACHMENT FOR A PLUGGABLE OPTICAL MODULE

(71) Applicant: Ciena Corporation, Hanover, MD (US)

(72) Inventors: Peter Vincent Saturley, Ottawa (CA); Jennifer Trac, Nepean (CA)

(73) Assignee: Ciena Corporation, Hanover, MD (US)

( * ) Notice: Subject to any disclaimer, the term of this patent is extended or adjusted under 35 U.S.C. 154(b) by 291 days.

(21) Appl. No.: 18/385,017

(22) Filed: Oct. 30, 2023

(65) Prior Publication Data

US 2025/0138263 A1     May 1, 2025

(51) Int. Cl.
*H04B 10/00*     (2013.01)
*G02B 6/42*     (2006.01)

(52) U.S. Cl.
CPC ......... *G02B 6/4269* (2013.01); *G02B 6/4278* (2013.01); *G02B 6/428* (2013.01)

(58) Field of Classification Search
CPC ..... G02B 6/4269; G02B 6/4278; G02B 6/428
See application file for complete search history.

(56) References Cited

U.S. PATENT DOCUMENTS

| | | | |
|---|---|---|---|
| 9,246,280 B2 * | 1/2016 | Neer | G02B 6/4268 |
| 9,851,519 B1 * | 12/2017 | Van Gaal | G02B 6/4269 |
| 10,939,536 B1 * | 3/2021 | O'Leary | H05K 1/0203 |
| 2003/0169581 A1 * | 9/2003 | Bright | G02B 6/4261 |
| | | | 361/816 |
| 2013/0210269 A1 * | 8/2013 | Neer | G02B 6/4284 |
| | | | 403/326 |
| 2017/0034951 A1 * | 2/2017 | Wang | G02B 6/4269 |
| 2018/0368283 A1 * | 12/2018 | Little | H01R 13/6581 |
| 2019/0113698 A1 * | 4/2019 | Huang | G02B 6/4249 |
| 2020/0027816 A1 * | 1/2020 | Morimoto | H01L 23/36 |
| 2020/0113077 A1 * | 4/2020 | Tittenhofer | H05K 5/0256 |
| 2020/0257067 A1 * | 8/2020 | Meunier | G02B 6/4284 |
| 2020/0370843 A1 * | 11/2020 | Jiwang | F28F 9/26 |
| 2021/0105025 A1 * | 4/2021 | Wall, Jr. | H04B 1/036 |

(Continued)

FOREIGN PATENT DOCUMENTS

| | | | | |
|---|---|---|---|---|
| JP | 2019075378 A | * | 5/2019 | ......... H01R 13/6335 |
| WO | WO-2011159599 A2 | * | 12/2011 | ........... G02B 6/4269 |
| WO | WO-2015073545 A1 | * | 5/2015 | ........... G02B 6/4284 |

*Primary Examiner* — Agustin Bello
(74) *Attorney, Agent, or Firm* — Clements Bernard Walker; Christopher L. Bernard

(57) ABSTRACT

A heatsink assembly including a printed circuit board having a primary side and a secondary side, a pluggable optical module cage coupled to the primary side of the printed circuit board and adapted to receive a pluggable optical module on the primary side of the printed circuit board, a plurality of pins coupled to the printed circuit board and protruding from the secondary side of the printed circuit board, a secondary side heatsink disposed on the secondary side of the printed circuit board and in thermal contact with the pluggable optical module through openings defined in the printed circuit board and a secondary side of the pluggable optical module cage, and a spring clip coupled to the plurality of pins and adapted to bias the secondary side heatsink towards a secondary side of the pluggable optical module to promote the thermal contact between the secondary side heatsink and the pluggable optical module.

20 Claims, 11 Drawing Sheets

(56) References Cited

U.S. PATENT DOCUMENTS

| | | | | |
|---|---|---|---|---|
| 2021/0325616 A1* | 10/2021 | Lands | ............... | G02B 6/4269 |
| 2021/0389534 A1* | 12/2021 | Yu | ................. | H05K 7/20336 |
| 2022/0003946 A1* | 1/2022 | Edwards, Jr. | ........ | G02B 6/4269 |
| 2022/0159878 A1* | 5/2022 | Dillman | ............ | H05K 7/20509 |
| 2022/0190921 A1* | 6/2022 | Chen | ................ | G02B 6/4269 |
| 2024/0206129 A1* | 6/2024 | Cai | ................. | H05K 7/20418 |
| 2025/0004224 A1* | 1/2025 | Huang | ............. | H01R 13/7172 |
| 2025/0138263 A1* | 5/2025 | Saturley | ............ | G02B 6/4278 |

\* cited by examiner

SMALL FOOTPRINT INDEPENDENT HEATSINK ATTACHMENT FOR A PLUGGABLE OPTICAL MODULE

TECHNICAL FIELD

The present disclosure relates generally to the telecommunications and optical networking fields. More particularly, the present disclosure relates to a small footprint independent heatsink attachment for a pluggable optical module (POM).

BACKGROUND

In a circuit pack or the like having a printed circuit board (PCB) with a primary side and a secondary side and a primary side POM cage and POM, both primary side and secondary side heatsinks may be utilized for enhanced POM cooling. In such arrangements, the secondary side heatsink is typically attached to the primary side POM cage and heatsink using coil springs secured by shoulder screws disposed adjacent to/between the primary side POM cages. This requires a significant amount of PCB space for the shoulder screws and coil springs, limiting the number of POMs that can be disposed in a fixed envelope, i.e. port count density. This also splits the spring force provided equally between the primary side and secondary side heatsinks, which may not be desirable if the heat transfer paths vary from primary side to secondary side and it is desirable to have higher contact force on one side of the PCB or the other.

The present background is provided as illustrative environmental context only and should not be construed to be limiting in any manner. It will be readily apparent to those of ordinary skill in the art that the principles and concepts of the present disclosure may be implemented in other environmental contexts equally.

BRIEF SUMMARY

The present disclosure provides a small footprint independent heatsink attachment for a POM that utilizes pins and a Z-shaped spring clip or the like to provide independent contact force to a secondary side heatsink that reaches through a PCB and into a primary side POM cage to contact a primary side POM and provide an additional heat transfer path for the primary side POM. Fine adjustment of the secondary side heatsink contact force is provided by selection of the height of the secondary side heatsink. This attachment is designed such that the tolerance of the thickness of the PCB does not impact the contact force provided. The pins require a reduced amount of PCB space, maximizing the number of POMs that can be disposed in a fixed envelope, i.e. port count density, and higher or lower contact force can be provided on the secondary side of the PCB, as desired.

In one embodiment, the present disclosure provides a heatsink assembly, including: a printed circuit board having a primary side and a secondary side; a pluggable optical module cage coupled to the primary side of the printed circuit board and adapted to receive a pluggable optical module on the primary side of the printed circuit board; a plurality of pins coupled to the printed circuit board and protruding from the secondary side of the printed circuit board; a secondary side heatsink disposed on the secondary side of the printed circuit board and in thermal contact with the pluggable optical module through an opening defined in the printed circuit board and an opening defined in a secondary side of the pluggable optical module cage; and a spring clip coupled to the plurality of pins and adapted to bias the secondary side heatsink towards a secondary side of the pluggable optical module to promote the thermal contact between the secondary side heatsink and the pluggable optical module. The heatsink assembly may also include: a primary side heatsink disposed on the primary side of the printed circuit board and in thermal contact with the pluggable optical module through an opening defined in a primary side of the pluggable optical module cage; and one or more clip springs coupled to the pluggable optical module cage and adapted to bias the primary side heatsink towards a primary side of the pluggable optical module to promote the thermal contact between the primary side heatsink and the pluggable optical module. The biasing of the secondary side heatsink towards the secondary side of the pluggable optical module is independent of the biasing of the primary side heatsink towards the primary side of the pluggable optical module. A thickness of the printed circuit board may be varied to a degree without affecting the biasing of the secondary side heatsink towards the secondary side of the pluggable optical module or the biasing of the primary side heatsink towards the primary side of the pluggable optical module. The plurality of pins do not protrude or protrude only minimally from the primary side of the printed circuit board adjacent to the pluggable optical module cage, such that the pins do not constrain the placement of the pluggable optical module cage or any primary side components on the printed circuit board. Each of the plurality of pins defines a circumferential recess at an end thereof. Optionally, the spring clip is a Z-shaped spring clip including slotted end portions and a central spring portion, where the slotted end portions are adapted to engage the circumferential recesses of the plurality of pins and the central spring portion is adapted to bias the secondary side heatsink towards the secondary side of the pluggable optical module. The secondary side heatsink defines a recess adapted to receive a portion of the spring clip therein. The primary side heatsink defines one or more recesses adapted to receive portions of the one or more clip springs.

In another embodiment, the present disclosure provides a heatsink assembly, including: a printed circuit board having a primary side and a secondary side; a pluggable optical module cage coupled to the primary side of the printed circuit board and adapted to receive a pluggable optical module on the primary side of the printed circuit board; a plurality of pins coupled to the printed circuit board and protruding from the secondary side of the printed circuit board; a secondary side heatsink disposed on the secondary side of the printed circuit board and in thermal contact with the pluggable optical module through an opening defined in the printed circuit board and an opening defined in a secondary side of the pluggable optical module cage; a spring clip coupled to the plurality of pins and adapted to bias the secondary side heatsink towards a secondary side of the pluggable optical module to promote the thermal contact between the secondary side heatsink and the pluggable optical module; a primary side heatsink disposed on the primary side of the printed circuit board and in thermal contact with the pluggable optical module through an opening defined in a primary side of the pluggable optical module cage; and one or more clip springs coupled to the pluggable optical module cage and adapted to bias the primary side heatsink towards a primary side of the pluggable optical module to promote the thermal contact between the primary side heatsink and the pluggable optical module. The biasing of the secondary side heatsink towards the secondary side of the pluggable optical module is independent of the biasing of the primary side heatsink towards the primary side of the pluggable optical module; and the plurality of pins do not protrude or protrude only minimally from the primary side of the printed circuit board adjacent to the pluggable optical module cage, such that the pins do not constrain the placement of the pluggable optical module cage or any primary side components on the printed circuit board.

In a further embodiment, the present disclosure provides a method for cooling a pluggable optical module received in a primary side pluggable optical module cage coupled to a printed circuit board having a primary side and a secondary side, the method including: coupling a plurality of pins to the printed circuit board such that the plurality of pins protrude from the secondary side of the printed circuit board; disposing a secondary side heatsink on the secondary side of the printed circuit board in thermal contact with the pluggable optical module through an opening defined in the printed circuit board and an opening defined in a secondary side of the pluggable optical module cage; and coupling a spring clip to the plurality of pins such that the spring clip biases the secondary side heatsink towards a secondary side of the pluggable optical module to promote the thermal contact between the secondary side heatsink and the pluggable optical module. The method may also include: disposing a primary side heatsink on the primary side of the printed circuit board in thermal contact with the pluggable optical module through an opening defined in a primary side of the pluggable optical module cage; and coupling one or more clip springs to the pluggable optical module cage such that the one or more clip springs bias the primary side heatsink towards a primary side of the pluggable optical module to promote the thermal contact between the primary side heatsink and the pluggable optical module. The biasing of the secondary side heatsink towards the secondary side of the pluggable optical module is independent of the biasing of the primary side heatsink towards the primary side of the pluggable optical module. A thickness of the printed circuit board may be varied to a degree without affecting the biasing of the secondary side heatsink towards the secondary side of the pluggable optical module or the biasing of the primary side heatsink towards the primary side of the pluggable optical module. The plurality of pins do not protrude or protrude only minimally from the primary side of the printed circuit board adjacent to the pluggable optical module cage, such that the pins do not constrain the placement of the pluggable optical module cage or any primary side components on the printed circuit board. Each of the plurality of pins defines a circumferential recess at an end thereof. Optionally, the spring clip is a Z-shaped spring clip including slotted end portions and a central spring portion, where the slotted end portions are adapted to engage the circumferential recesses of the plurality of pins and the central spring portion is adapted to bias the secondary side heatsink towards the secondary side of the pluggable optical module. The secondary side heatsink defines a recess adapted to receive a portion of the spring clip therein. The primary side heatsink defines one or more recesses adapted to receive portions of the one or more clip springs.

It will be readily apparent to those of ordinary skill in the art that aspects and features of each of the described embodiments may be incorporated, omitted, and/or combined as desired in a given application, without limitation.

BRIEF DESCRIPTION OF THE DRAWINGS

The present disclosure is illustrated and described with reference to the various drawings, in which like reference numbers are used to denote like assembly components/method steps, as appropriate, and in which:

FIG. 7 shows the secondary side heatsink arrangement of the present disclosure, the secondary side heatsink coupled to a primary side POM using pins and a Z-shaped spring clip or the like;

FIG. 8 further shows the secondary side heatsink arrangement of the present disclosure, the secondary side heatsink coupled to a primary side POM using pins and a Z-shaped spring clip or the like;

FIG. 10 further shows the secondary side heatsink arrangement of the present disclosure, the secondary side heatsink coupled to a primary side POM using pins and a Z-shaped spring clip or the like.

It will be readily apparent to those of ordinary skill in the art that aspects and features of each of the illustrated embodiments may be incorporated, omitted, and/or combined as desired in a given application, without limitation.

DETAILED DESCRIPTION

Figure 1:
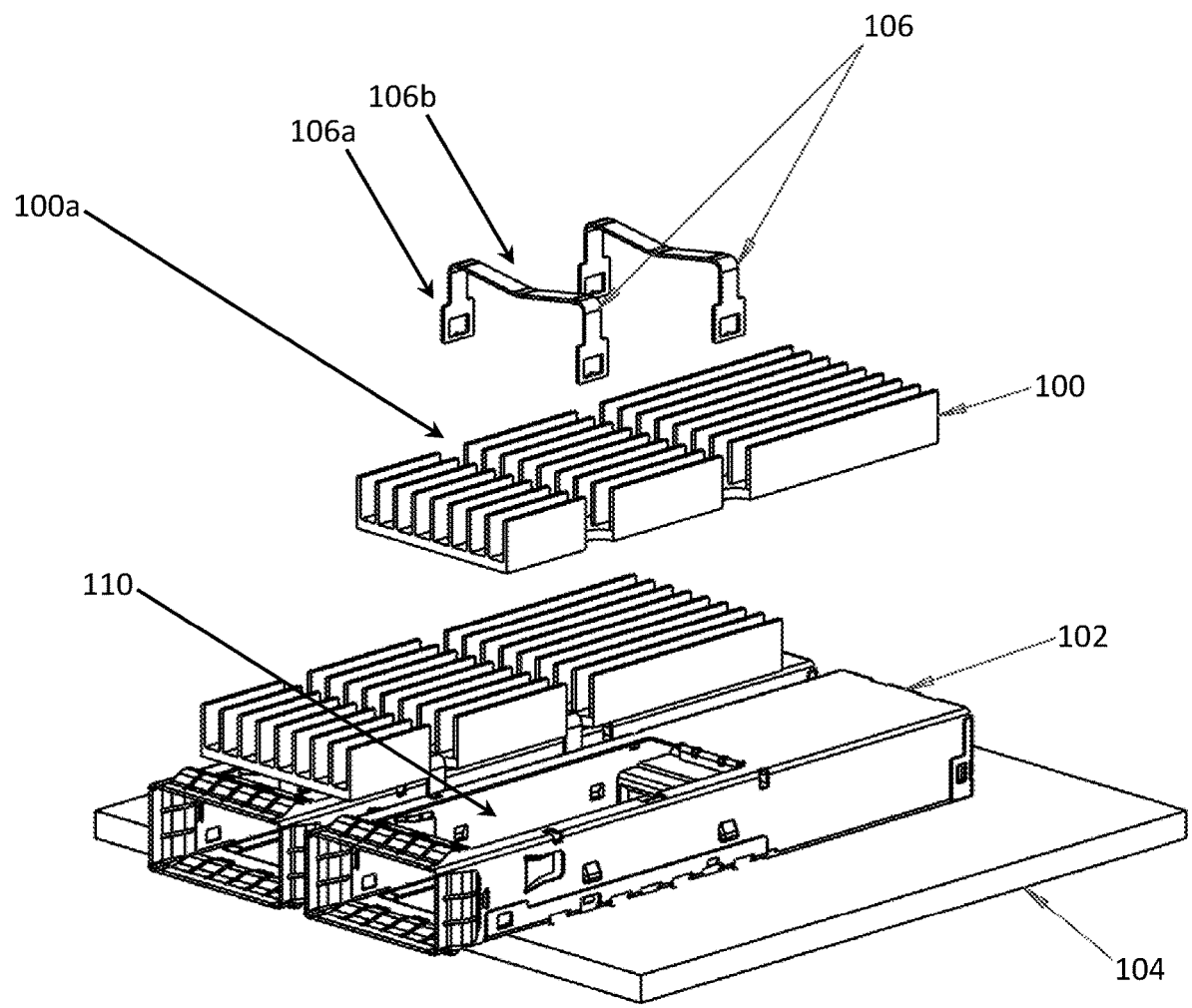
FIG. 1 shows the typical arrangement of a primary side heatsink to a primary side POM using a clip spring.
Figure 2:
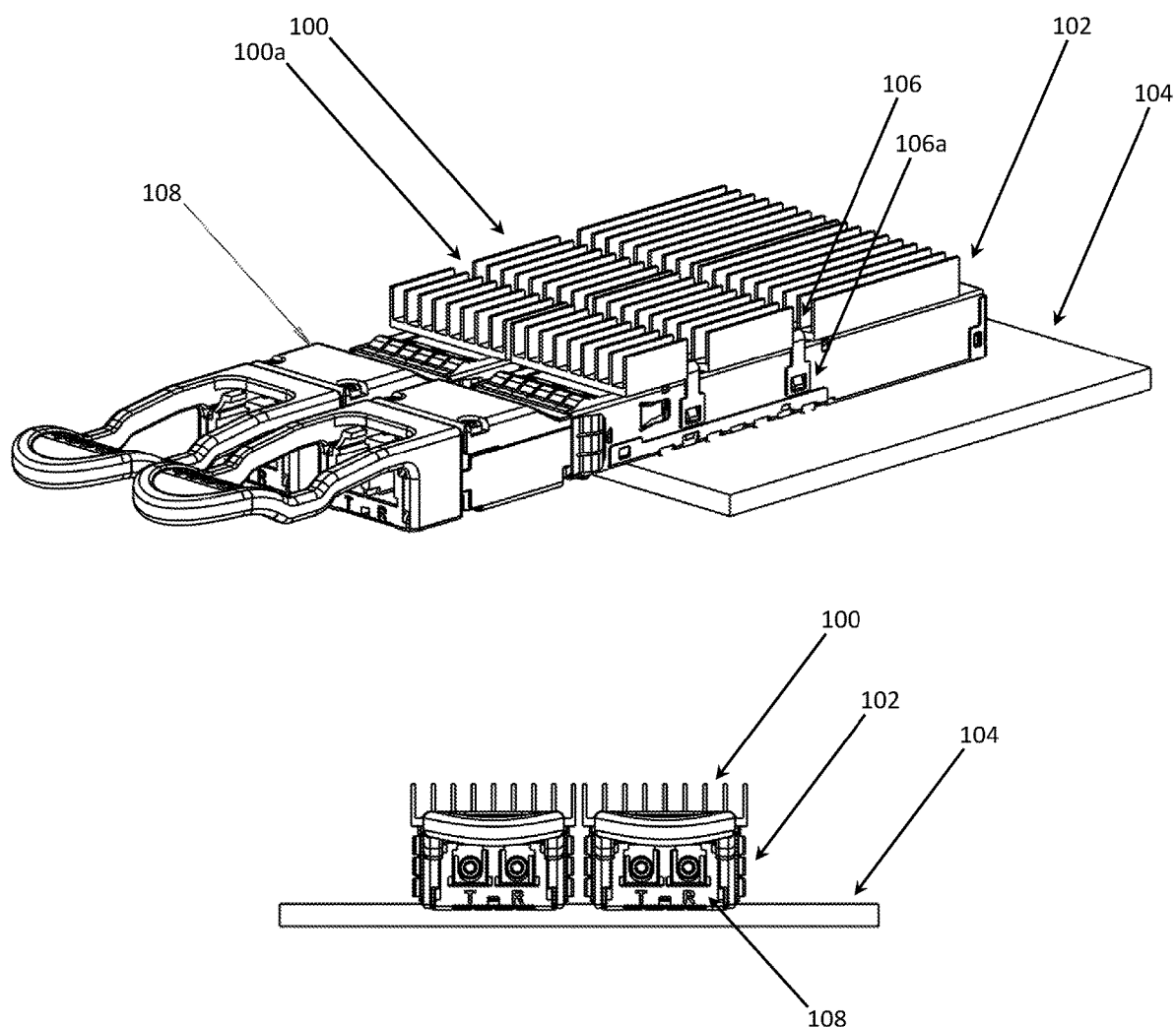
FIG. 2 further shows the typical arrangement of a primary side heatsink to a primary side POM using a clip spring.

As alluded to above, many POMs require a heatsink to function properly. Referring to FIGS. 1 and 2, this heatsink 100 may be affixed to the exposed surface of the POM cage 102 coupled to the PCB 104 via one or more clip springs 106 that are disposed about the heatsink 100 within recesses 100a of the heatsink 100 and attached to the sides of the POM cage 102, engaging protrusions, being attached with screws, etc. The clip spring(s) 106 include side attachment portions 106a that engage the protrusions and a central spring portion 106b that ensures good contact between the heatsink 100 and the POM 108 disposed within the POM cage 102. The heatsink 100 contacts the POM 108 through an opening 110 provided in the exposed surface of the POM cage 102. It should be noted that in FIGS. 1 and 2, a primary side POM 108, POM cage 102, and heatsink 100 are illustrated, as well as multiple such POMs 108, POM cages 102, and heatsinks 100 disposed adjacent to one another. It will be readily apparent to those of ordinary skill in the art that, as used here, primary side and secondary side can alternatively be top and bottom, bottom and top, left and right, or right and left.

The contact through the opening 110 provides a path for heat to exit the POM 108 and enter the airstream flowing over the heatsink 100. One of the factors determining the rate of heat transfer through this contact is the force and pressure provided by the clip spring(s) 106. In general, when using a heatsink 100 on a fixed device it is normal to set the force or pressure as high as possible to facilitate heat transfer, but with a POM 108 the friction between the heatsink 100 and the POM 108 must be overcome during insertion and removal of the POM 108 into and from the POM cage 102. Thus, the contact forces must be controlled and limited to a specified value. The force or pressure provided by the clip spring(s) 106 is proportional to the displacement of the central spring portion 106b from its free condition, and in compact designs the tolerances of the components must be tightly controlled as variations in the heights of the components can have a significant impact on the spring force.

As power levels increase, it is sometimes necessary to affix a secondary side heatsink to the secondary side of the POM cage 102 and POM 108, and the secondary side of the PCB 104. In existing form factors, the POM cage 102 does not have an integrated spring mechanism, and an additional means is required. Thus, the present disclosure uses pins and a Z-shaped spring clip normally used for attaching a heatsink to a fixed device and arranges them in such a manner as to provide a flexible secondary side heatsink attachment mechanism while using a minimal amount of PCB space.

Figure 3:
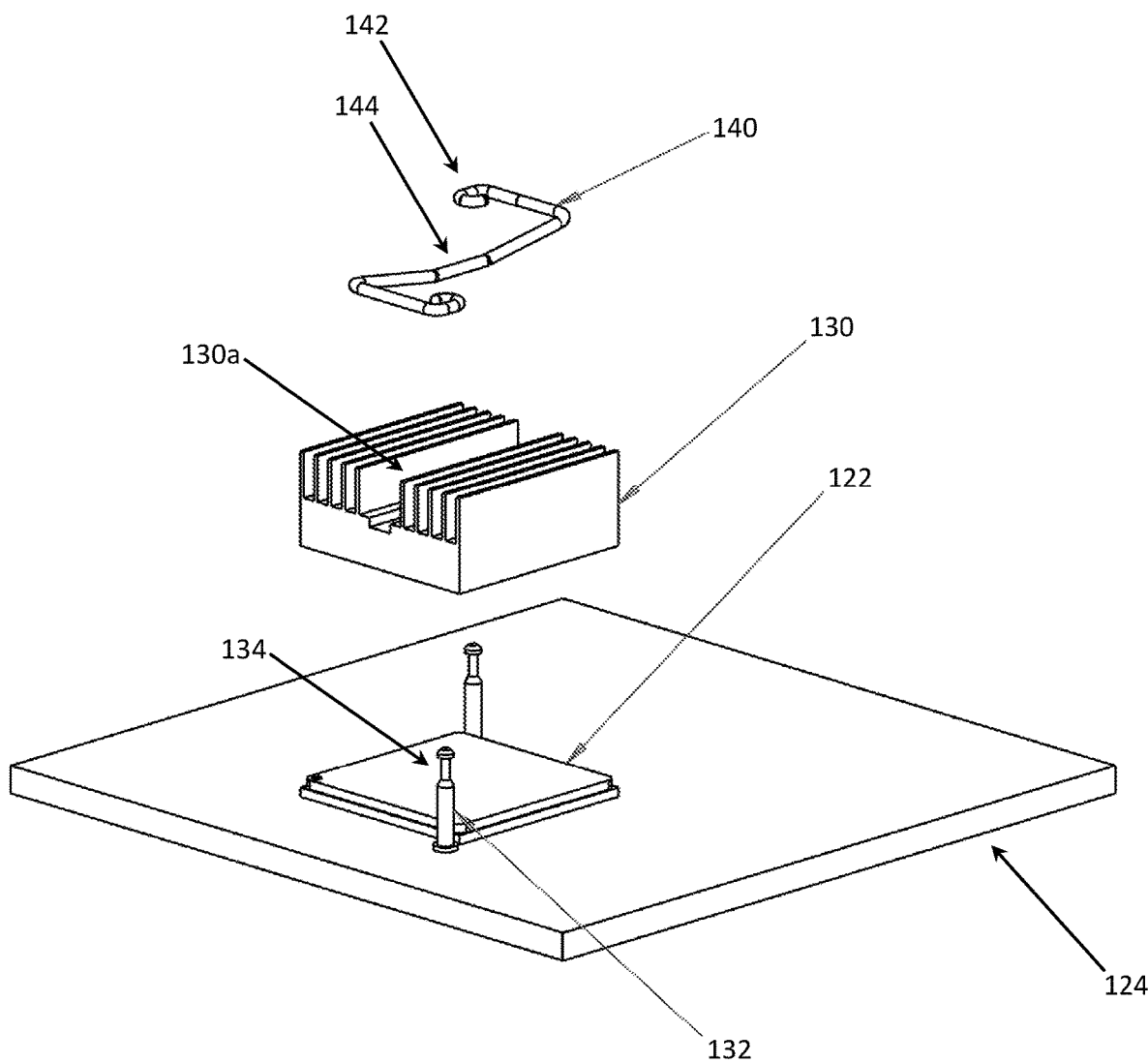
FIG. 3 shows the typical arrangement of a heatsink to a fixed device using a Z-shaped spring clip.
Figure 4:
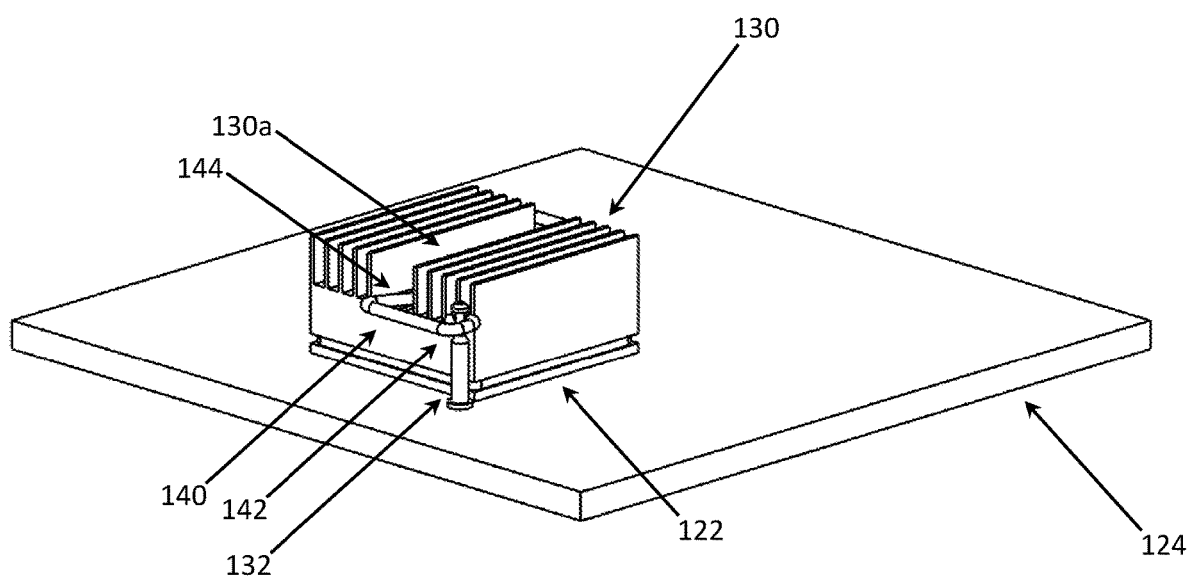
FIG. 4 further shows the typical arrangement of a heatsink to a fixed device using a Z-shaped spring clip.

Referring to FIGS. 3 and 4, in a typical application for cooling a fixed device 122, such as an application specific integrated circuit (ASIC) or the like, disposed on a PCB 124, the heatsink 130 is disposed in contact with the fixed device 122. A pair of pins 132 are disposed through the PCB 124 from secondary side to primary side and secured to the secondary side on either side of the fixed device 122 and heatsink 130. Each of these pins 132 includes a circumferential recess 134 at an end thereof on the primary side of the PCB 124. A Z-shaped spring clip 140 including slotted end portions 142 and a central spring portion 144 is disposed over the heatsink 130 within a recess 130a of the heatsink 130, with the slotted end portions 142 being secured to the circumferential recesses 134 of the pins 132. In this arrangement, the central spring portion 144 of the Z-shaped spring clip 140 provides a contact force or pressure between the heatsink 130 and the fixed device 122, thereby facilitating heat transfer between the fixed device 122 and the heatsink 130.

Figure 5:
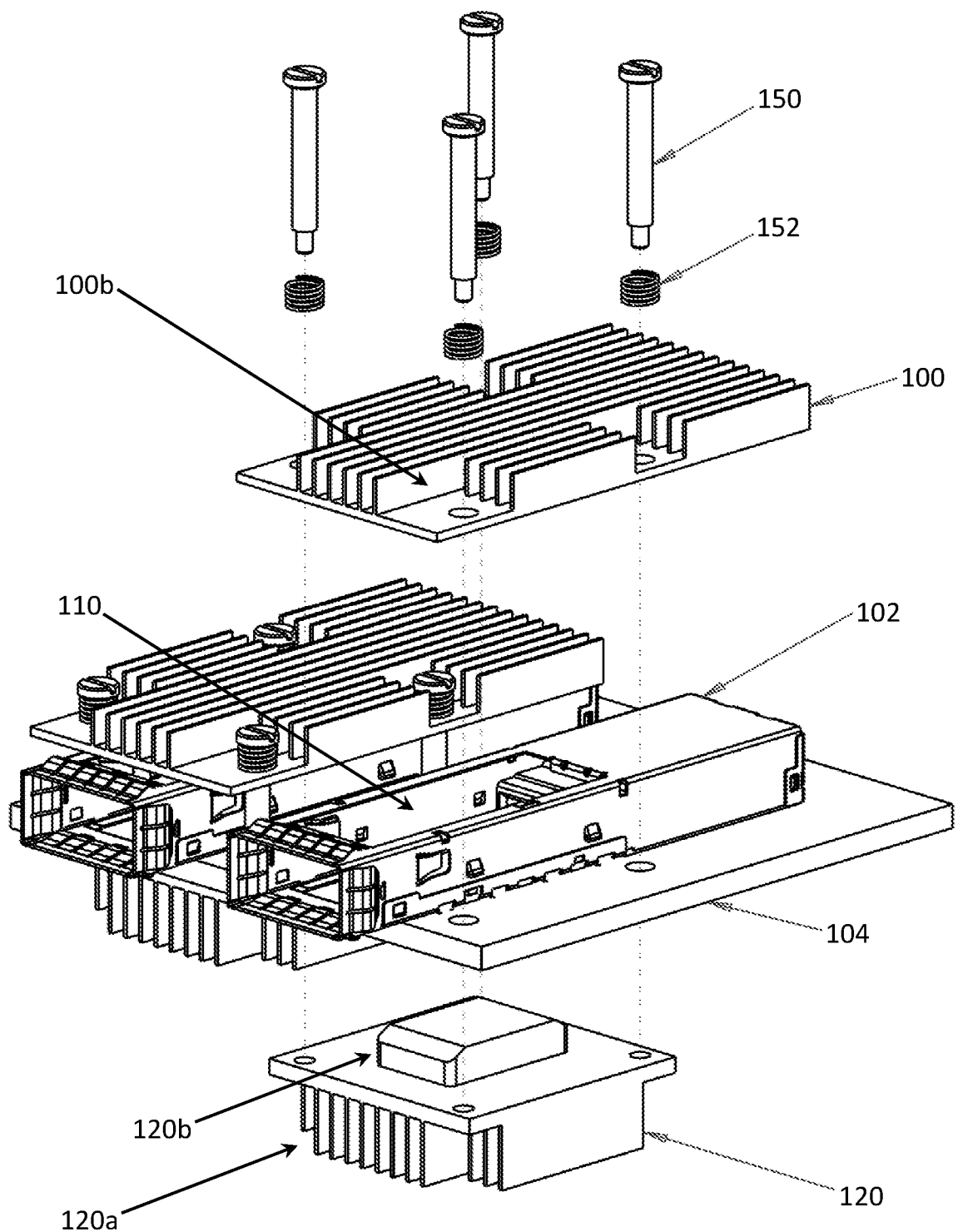
FIG. 5 shows the typical arrangement of a secondary side heatsink to a primary side POM using shoulder screws and coil springs.
Figure 6:
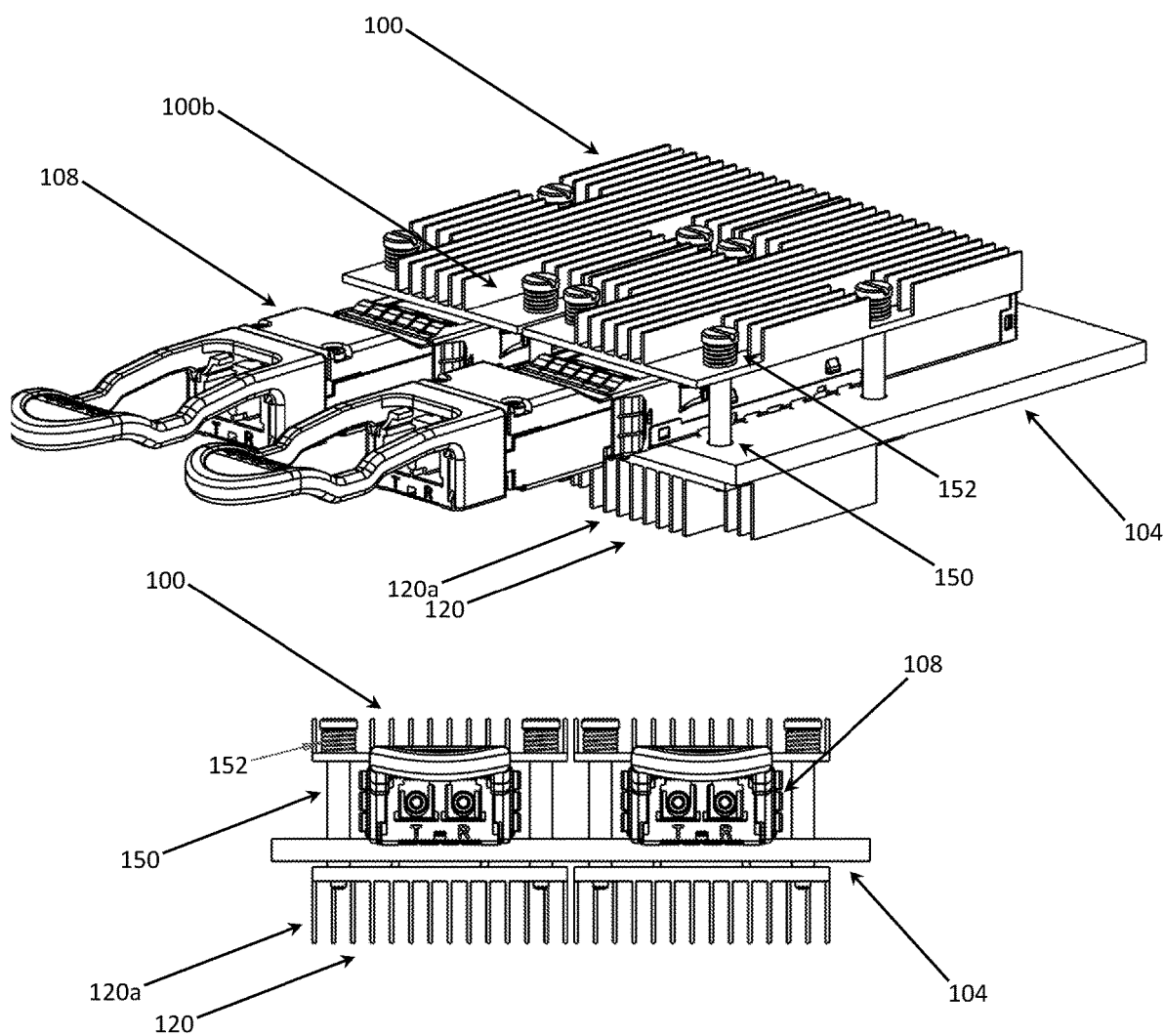
FIG. 6 further shows the typical arrangement of a secondary side heatsink to a primary side POM using shoulder screws and coil springs.

Referring to FIGS. 5 and 6, when it is necessary to affix a secondary side heatsink 120 to the secondary side of the POM cage 102 and POM 108 and the secondary side of the PCB 104, shoulder screws 150 are typically disposed through the primary side heatsink 100, adjacent to and between the POM cages 102, through the PCB 104, and secured to the secondary side heatsink 120. Coil springs 152 are disposed around the primary side ends of the shoulder screws 150 and retained by the heads thereof in recesses 100b formed in the primary side heatsink 100. Again, the primary side heatsink 100 is thermally coupled to the POM 108 through an opening 110 in the top of the POM cage 102. The secondary side heatsink 120 includes a finned portion 120a or the like and a base 120b that contacts and thermally couples the secondary side heatsink 120 to the POM 108 through the PCB 104 and the POM cage 102, which again includes an associated opening at the PCB interface.

In this arrangement, the shoulder screws 150 disposed around and between the POM cages 102 take up a significant amount of PCB space, at the expense of port count density, and the primary side heatsink 100 and secondary side heatsink 120 must be oversized accordingly to accommodate the shoulder screw attachment points. Further, because the primary side heatsink 100 is coupled to the secondary side heatsink 120 by the shoulder screws 150 through the PCB 104, dimensional changes in the components disposed between the primary side heatsink 100 and the secondary side heatsink 120 change the forces and pressures applied to and by the primary side heatsink 100 and the secondary side heatsink 120 to the POM 108, possibly undesirably affecting POM insertion and removal characteristics. Such dimensional changes include those made to the primary side heatsink 100, the secondary side heatsink 120, the POM cage 102, the PCB 104, etc.

The present disclosure provides a small footprint independent heatsink attachment for a POM that utilizes pins and a Z-shaped spring clip or the like to provide contact force to a secondary side heatsink that reaches through a PCB and into a primary side POM cage to contact a primary side POM and provide an additional heat transfer path. Fine adjustment of the secondary side heatsink contact force is provided by selection of the height of the secondary side heatsink. This attachment is designed such that the tolerance of the thickness of the PCB does not impact the contact force provided. The pins require a reduced amount of PCB space, maximizing port count density, and higher or lower contact force can be provided on the secondary side of the PCB, as desired.

Figure 7:
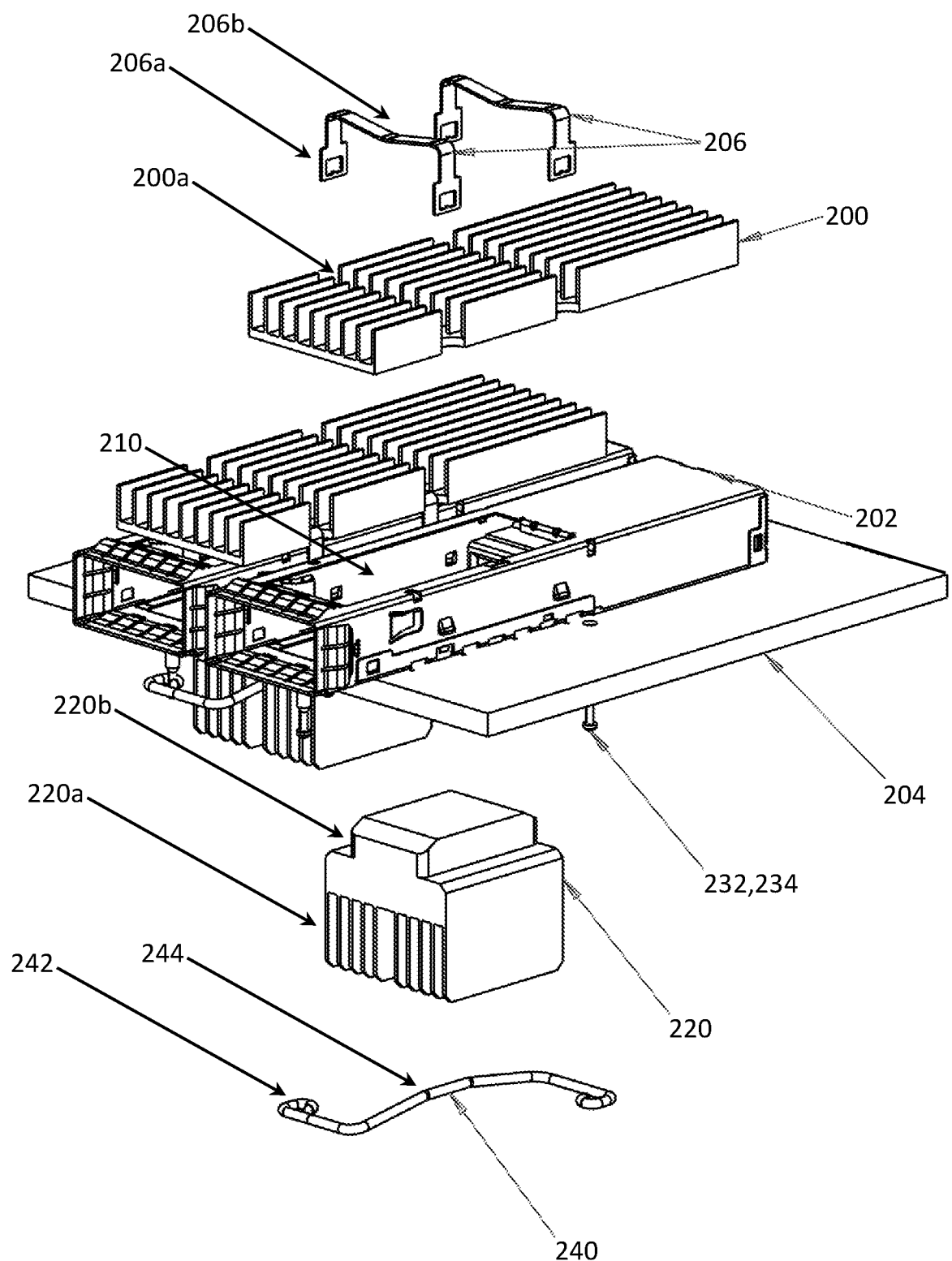
Figure 8:
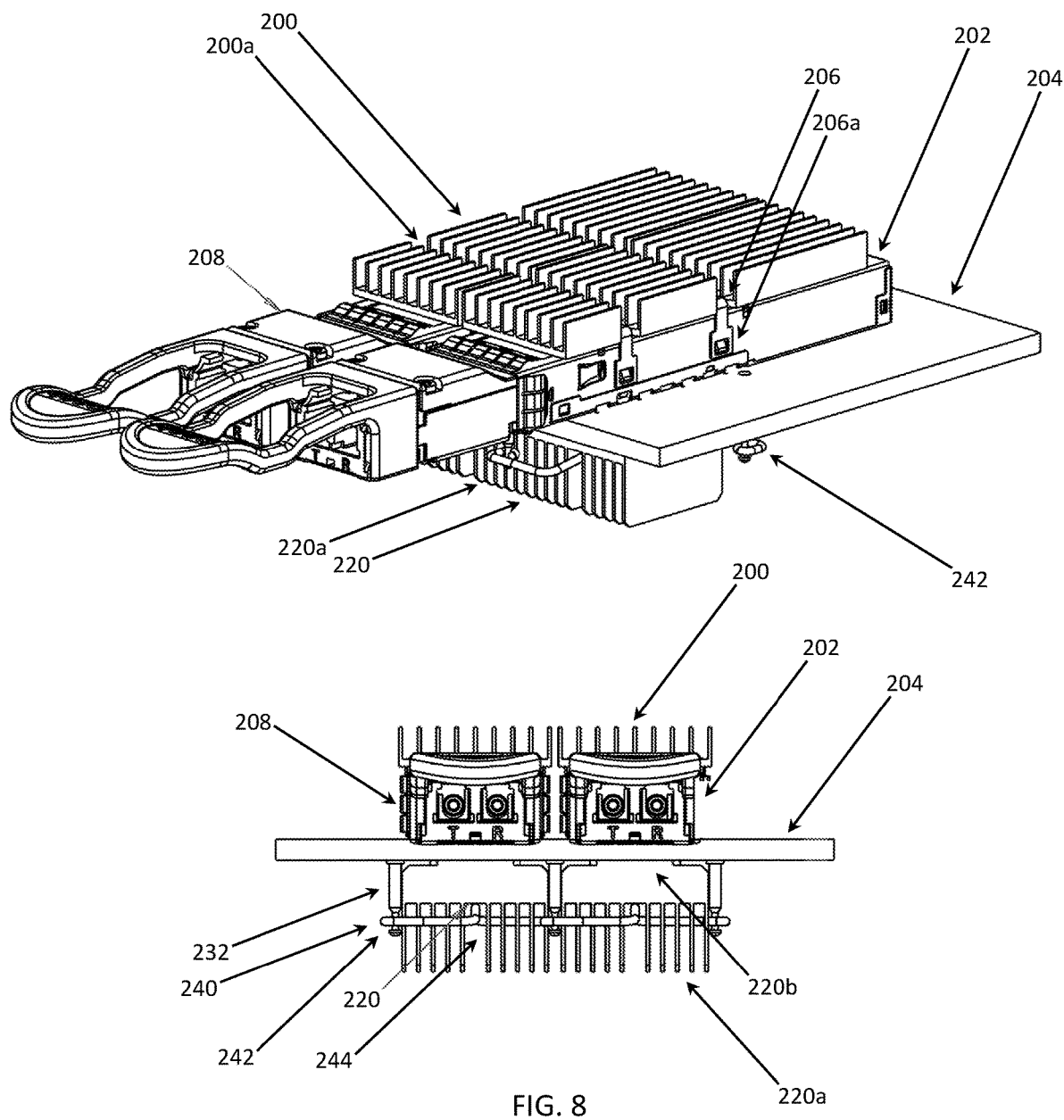

Referring to FIGS. 7 and 8, the primary side heatsink 200 is again affixed to the exposed surface of the POM cage 202 coupled to the PCB 204 via one or more clip springs 206 that are disposed about the heatsink 200 within recesses 200a of the heatsink 200 and attached to the sides of the POM cage 202. The clip spring(s) 206 include side attachment portions 206a that engage protrusions on the sides of the POM cage 202 and a central spring portion 206b that ensures good contact between the heatsink 200 and the POM 208 disposed within the POM cage 202. The heatsink 200 contacts the POM 208 through an opening 210 provided in the exposed surface of the POM cage 202. It should be noted that in FIGS. 7 and 8, a primary side POM 208, POM cage 202, and heatsink 200 are illustrated, as well as multiple such POMs 208, POM cages 202, and heatsinks 200 disposed adjacent to one another. Again, it will be readily apparent to those of ordinary skill in the art that, as used here, primary side and secondary side can alternatively be top and bottom, bottom and top, left and right, or right and left.

The contact through the opening 210 provides a path for heat to exit the POM 208 and enter the airstream flowing over the heatsink 200. The force or pressure provided by the clip spring(s) 206 is proportional to the displacement of the central spring portion 206b from its free condition, affecting only the primary side heatsink 200.

Regarding the secondary side heatsink 220 coupled to the secondary side of the POM cage 202 and POM 208, and the secondary side of the PCB 204, pins 232 are secured to and disposed through the PCB 204, adjacent to and between the POM cages 202, but take up a minimal amount of PCB space adjacent to and between the POM cages 202, and are secured to the secondary side heatsink 220 using a Z-shaped spring clip 240 or the like. The elongate pins 232 are typically made of a metallic material and have a small diameter, with a widened portion at the primary side end thereof that is secured to the primary side of the PCB 204. The secondary side heatsink 220 includes a finned portion 220a or includes similar cooling structures and a base 220b that contacts and thermally couples the secondary side heatsink 220 to the POM 208 through the PCB 204 and the POM cage 202, which again includes an associated opening at the interface between the POM cage 202 and the PCB 204.

Each of the pins 232 includes a circumferential recess 234 at the secondary side end thereof, opposite the widened portion, on the secondary side of the PCB 204. The Z-shaped spring clip 240 includes slotted end portions 242 and a central spring portion 244 that is disposed over the heatsink 220 within a recess 220a of the heatsink 220, with the slotted end portions 242 being secured to the circumferential recesses 234 of the pins 232. In this arrangement, the central spring portion 244 of the Z-shaped spring clip 240 provides a contact force or pressure between the secondary side heatsink 220 and the POM 208 independent of the primary side heatsink 200, thereby facilitating heat transfer between the POM 208 and the secondary side heatsink 220. It should be noted that any suitable spring structure can be coupled to the pins 232 and over the secondary side heatsink to retain the secondary side heatsink 220 and compress the base 220b of the secondary side heatsink 220 into the POM 208 through the PCB 204 and the opening 210 of the POM cage 202. The Z-shaped spring clip 240 is one suitable example that is typically used to compress a heatsink 130 into a fixed device 122 in other applications.

Figure 9:
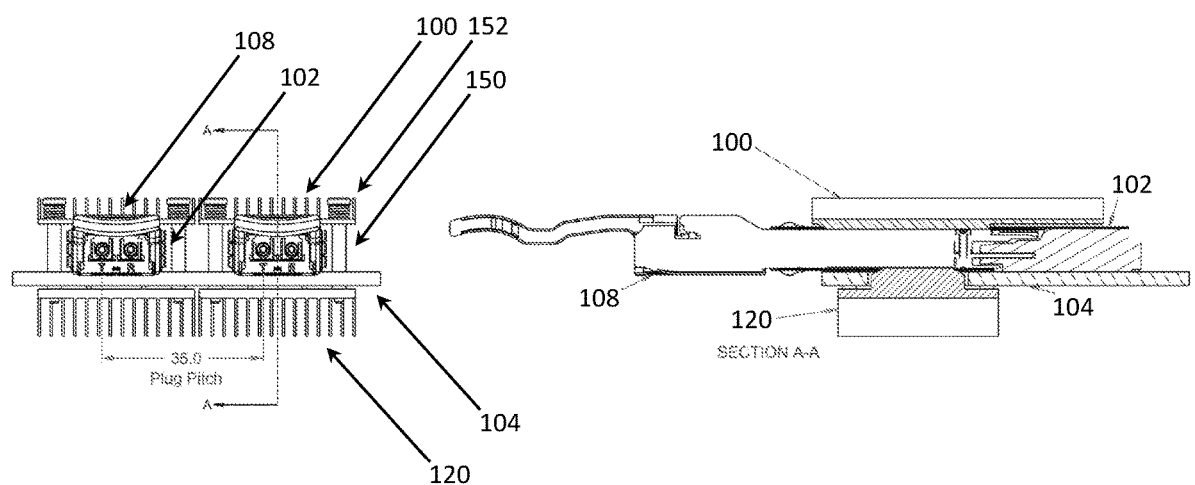
FIG. 9 further shows the typical arrangement of a secondary side heatsink to a primary side POM using shoulder screws and coil springs.
Figure 10:
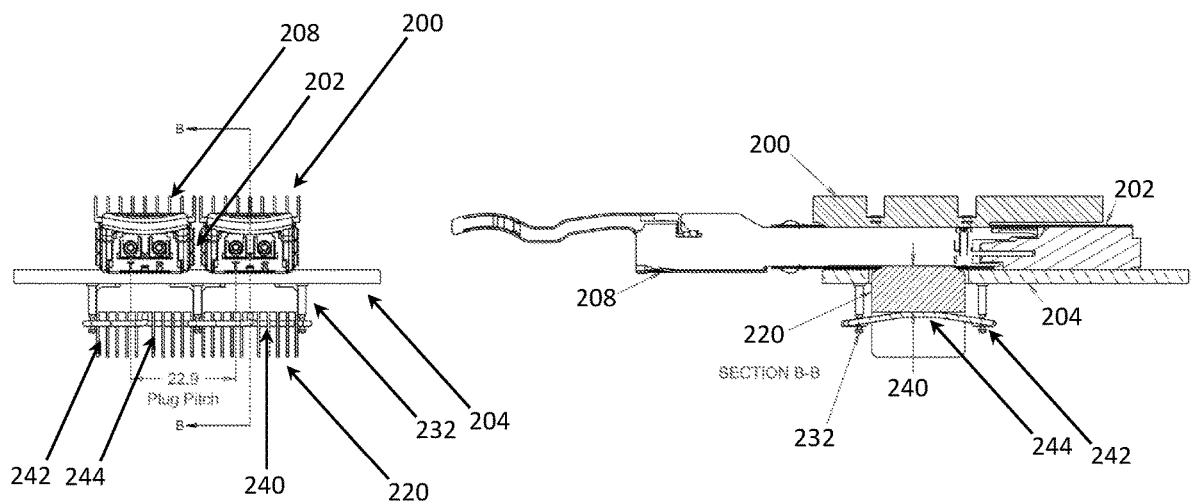

By comparing FIGS. 9 and 10, some significant advantages of the present disclosure become apparent. The use of shoulder screws 150 and coil springs 152 between the POMs 108 to couple the primary side heatsink 100 to the secondary side heatsink 120 through the PCB 104 requires significantly more separation of the POM cages 102 on the primary side of the PCB 104, sacrificing port density. The use of pins 232 to couple the secondary side heatsink 220 to the PCB 204 requires significantly less separation of the POM cages 202 on the primary side of the PCB 204, as nothing is ultimately disposed between the POM cages 202 on the primary side of the PCB 204, enhancing port density.

Because the pins 232 do not directly couple the secondary side heatsink 220 to the primary side heatsink 200 in the way that the shoulder screws couple the secondary side heatsink 120 to the primary side heatsink 100, changes in component thickness between the secondary side heatsink 220 and the primary side heatsink 200 have less effect on the contact force provided between the secondary side heatsink 220 and the POM 208. By way of example, as seen in FIG. 10, changing the thickness of the PCB 204 does not affect the force provided by the Z-shaped spring clip 240 to compress the secondary side heatsink 220 against the POM 208, which is only affected by the spring bend provided in the central spring portion 244 of the Z-shaped spring clip 240, as the attachment of the slotted end portion 242 to the pins 232 remains constant despite the change in thickness of the PCB 204. Contrasting FIG. 9, any change to the thickness of the PCB 104 or any other component disposed between the secondary side heatsink 120 and the primary side heatsink 100 affects the force applied by both the primary side heatsink 100 and the secondary side heatsink 120, as the primary side heatsink 100 and the secondary side heatsink 120 are coupled to one another by the shoulder screws 150 and coil springs 152. In the present disclosure, the force applied by the clips spring(s) 206 affects the primary side heatsink 200 and, independently, the force applied by the Z-shaped spring clip 240 affects the secondary side heatsink 220.

Figure 11:
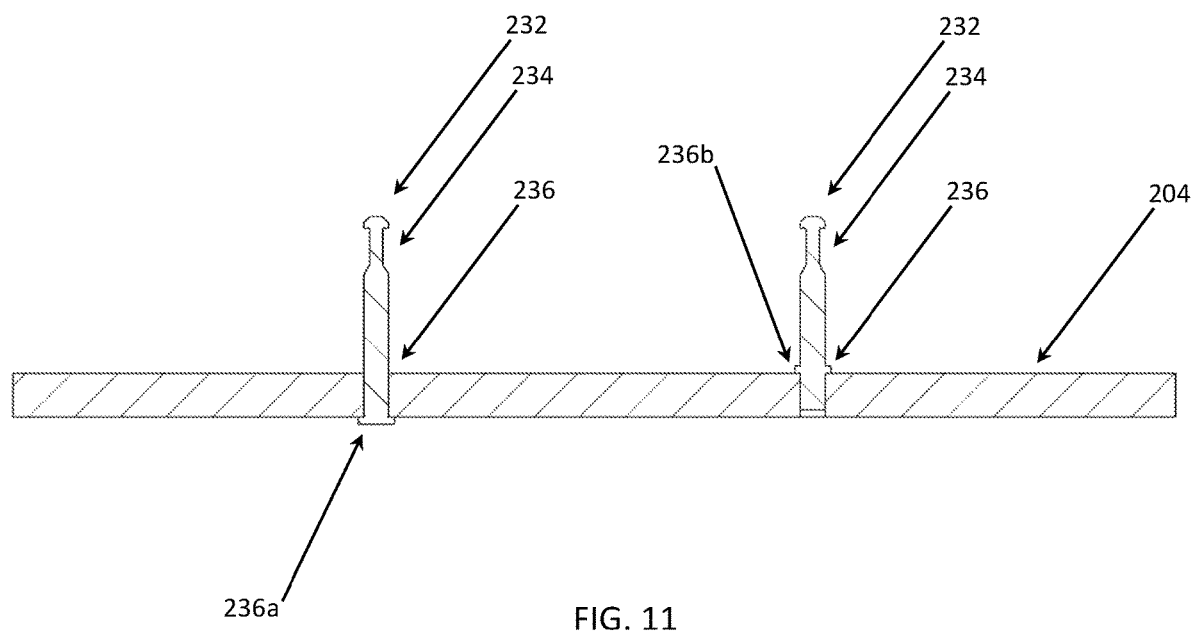
FIG. 11 shows various pins that may be used with the secondary side heatsink arrangement of the present disclosure.

Referring to FIG. 11, the plurality of pins 232 that protrude from the secondary side of the PCB 204 and include the circumferential recesses 234 to which the end portions 242 of the Z-shaped spring clip 240 are attached may have several different configurations. For example, the base 236 of the pin 232 may pass through the PCB 204 and include a primary side flange 236a that prevents the spring from pulling the pin through primary side of the PCB 204. Alternatively, the base 236 of the pin 232 may only pass into the PCB 204 and include a secondary side flange 236b to fix the height relative to the secondary side of the PCB 204. In this case, the flange 236b serves as a stop and the pin is secured to the appropriate side of the PCB 204 by soldering, adhesive, etc., such that no portion of the pin 232 interferes with the placement of components on the primary side of the PCB 204, the pin protruding only from the secondary side of the PCB 204. For example, the PCB 204 may be run through wave solder, with the primary joint between the barrel of the hole and the cylindrical surface of the pin 232. The area of the flange 236a, 236b alone may not be strong enough to counterbalance the force of the spring 244.

Although the present disclosure is illustrated and described with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:
1. A heatsink assembly, comprising:
 a printed circuit board having a primary side and a secondary side;
 a pluggable optical module cage coupled to the primary side of the printed circuit board and adapted to receive a pluggable optical module on the primary side of the printed circuit board;
 a plurality of pins coupled to the printed circuit board and protruding from the secondary side of the printed circuit board;
 a secondary side heatsink disposed on the secondary side of the printed circuit board and in thermal contact with the pluggable optical module through an opening defined in the printed circuit board and an opening defined in a secondary side of the pluggable optical module cage; and
 a spring clip coupled to the plurality of pins and adapted to bias the secondary side heatsink towards a secondary side of the pluggable optical module to promote the thermal contact between the secondary side heatsink and the pluggable optical module.

2. The heatsink assembly of claim 1, further comprising:
 a primary side heatsink disposed on the primary side of the printed circuit board and in thermal contact with the pluggable optical module through an opening defined in a primary side of the pluggable optical module cage; and
 one or more clip springs coupled to the pluggable optical module cage and adapted to bias the primary side heatsink towards a primary side of the pluggable optical module to promote the thermal contact between the primary side heatsink and the pluggable optical module.

3. The heatsink assembly of claim 2, wherein the biasing of the secondary side heatsink towards the secondary side of the pluggable optical module is independent of the biasing of the primary side heatsink towards the primary side of the pluggable optical module.

4. The heatsink assembly of claim 2, wherein a thickness of the printed circuit board may be varied to a degree without affecting the biasing of the secondary side heatsink towards the secondary side of the pluggable optical module or the biasing of the primary side heatsink towards the primary side of the pluggable optical module.

5. The heatsink assembly of claim 1, wherein the plurality of pins do not protrude from the primary side of the printed circuit board adjacent to the pluggable optical module cage to an extent that the pins constrain the placement of the pluggable optical module cage or any primary side components on the printed circuit board.

6. The heatsink assembly of claim 1, wherein each of the plurality of pins defines a circumferential recess at an end thereof.

7. The heatsink assembly of claim 6, wherein the spring clip is a Z-shaped spring clip comprising slotted end portions and a central spring portion, wherein the slotted end portions are adapted to engage the circumferential recesses of the plurality of pins and the central spring portion is adapted to bias the secondary side heatsink towards the secondary side of the pluggable optical module.

8. The heatsink assembly of claim 1, wherein the secondary side heatsink defines a recess adapted to receive a portion of the spring clip therein.

9. The heatsink assembly of claim 2, wherein the primary side heatsink defines one or more recesses adapted to receive portions of the one or more clip springs.

10. A heatsink assembly, comprising:
a printed circuit board having a primary side and a secondary side;
a pluggable optical module cage coupled to the primary side of the printed circuit board and adapted to receive a pluggable optical module on the primary side of the printed circuit board;
a plurality of pins coupled to the printed circuit board and protruding from the secondary side of the printed circuit board;
a secondary side heatsink disposed on the secondary side of the printed circuit board and in thermal contact with the pluggable optical module through an opening defined in the printed circuit board and an opening defined in a secondary side of the pluggable optical module cage;
a spring clip coupled to the plurality of pins and adapted to bias the secondary side heatsink towards a secondary side of the pluggable optical module to promote the thermal contact between the secondary side heatsink and the pluggable optical module;
a primary side heatsink disposed on the primary side of the printed circuit board and in thermal contact with the pluggable optical module through an opening defined in a primary side of the pluggable optical module cage; and
one or more clip springs coupled to the pluggable optical module cage and adapted to bias the primary side heatsink towards a primary side of the pluggable optical module to promote the thermal contact between the primary side heatsink and the pluggable optical module.

11. The heatsink assembly of claim 10, wherein:
the biasing of the secondary side heatsink towards the secondary side of the pluggable optical module is independent of the biasing of the primary side heatsink towards the primary side of the pluggable optical module; and
the plurality of pins do not protrude from the primary side of the printed circuit board adjacent to the pluggable optical module cage to an extent that the pins constrain the placement of the pluggable optical module cage or any primary side components on the printed circuit board.

12. A method for cooling a pluggable optical module received in a primary side pluggable optical module cage coupled to a printed circuit board having a primary side and a secondary side, the method comprising:
coupling a plurality of pins to the printed circuit board such that the plurality of pins protrude from the secondary side of the printed circuit board;
disposing a secondary side heatsink on the secondary side of the printed circuit board in thermal contact with the pluggable optical module through an opening defined in the printed circuit board and an opening defined in a secondary side of the pluggable optical module cage; and
coupling a spring clip to the plurality of pins such that the spring clip biases the secondary side heatsink towards a secondary side of the pluggable optical module to promote the thermal contact between the secondary side heatsink and the pluggable optical module.

13. The method of claim 12, further comprising:
disposing a primary side heatsink on the primary side of the printed circuit board in thermal contact with the pluggable optical module through an opening defined in a primary side of the pluggable optical module cage; and
coupling one or more clip springs to the pluggable optical module cage such that the one or more clip springs bias the primary side heatsink towards a primary side of the pluggable optical module to promote the thermal contact between the primary side heatsink and the pluggable optical module.

14. The method of claim 13, wherein the biasing of the secondary side heatsink towards the secondary side of the pluggable optical module is independent of the biasing of the primary side heatsink towards the primary side of the pluggable optical module.

15. The method of claim 13, wherein a thickness of the printed circuit board may be varied to a degree without affecting the biasing of the secondary side heatsink towards the secondary side of the pluggable optical module or the biasing of the primary side heatsink towards the primary side of the pluggable optical module.

16. The method of claim 12, wherein the plurality of pins do not protrude from the primary side of the printed circuit board adjacent to the pluggable optical module cage to an extent that the pins constrain the placement of the pluggable optical module cage or any primary side components on the printed circuit board.

17. The method of claim 12, wherein each of the plurality of pins defines a circumferential recess at an end thereof.

18. The method of claim 17, wherein the spring clip is a Z-shaped spring clip comprising slotted end portions and a central spring portion, wherein the slotted end portions are adapted to engage the circumferential recesses of the plurality of pins and the central spring portion is adapted to bias the secondary side heatsink towards the secondary side of the pluggable optical module.

19. The method of claim 12, wherein the secondary side heatsink defines a recess adapted to receive a portion of the spring clip therein.

20. The method of claim 13, wherein the primary side heatsink defines one or more recesses adapted to receive portions of the one or more clip springs.

* * * * *